United States Patent Office 3,267,366
Patented August 16, 1966

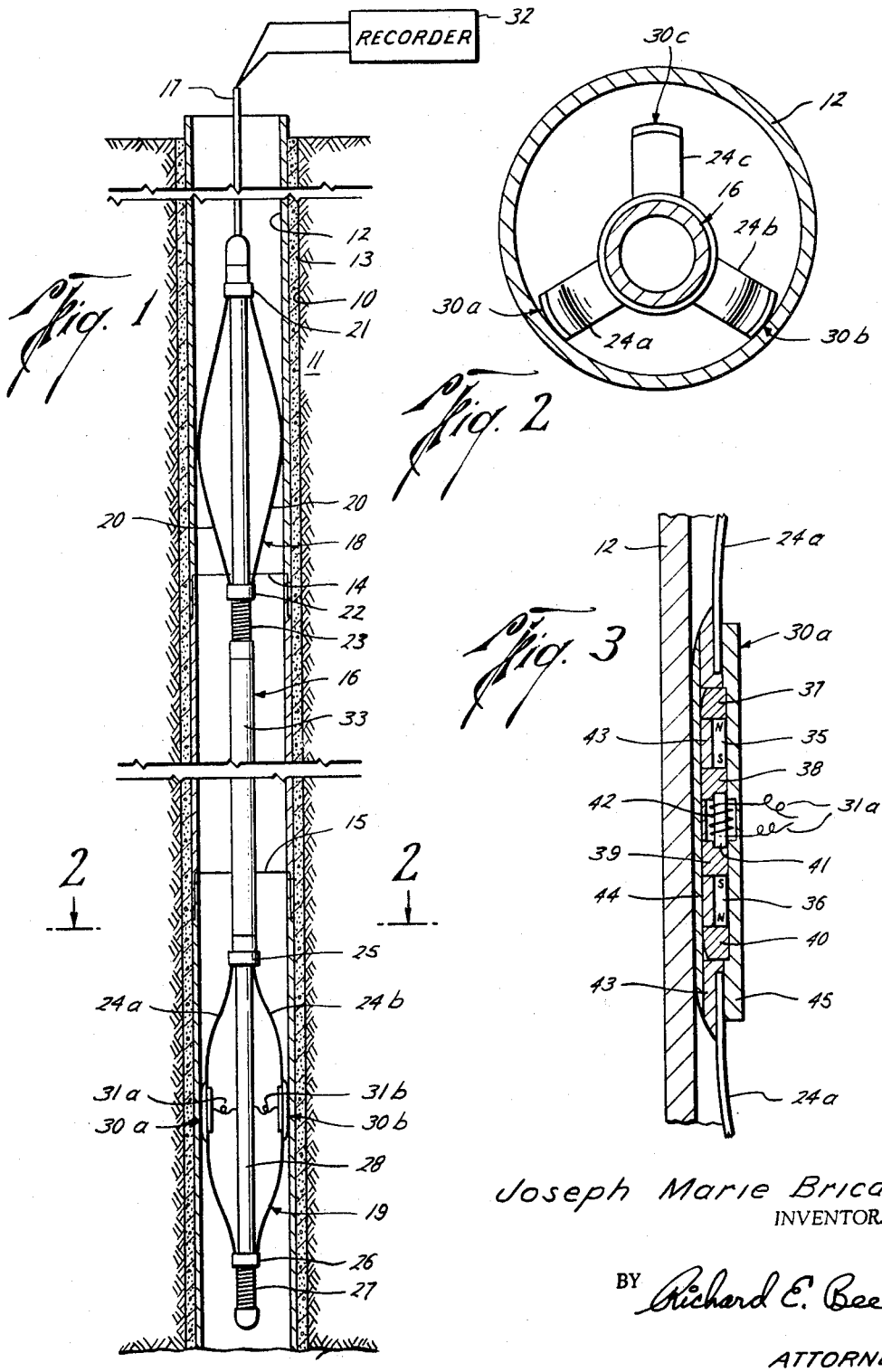

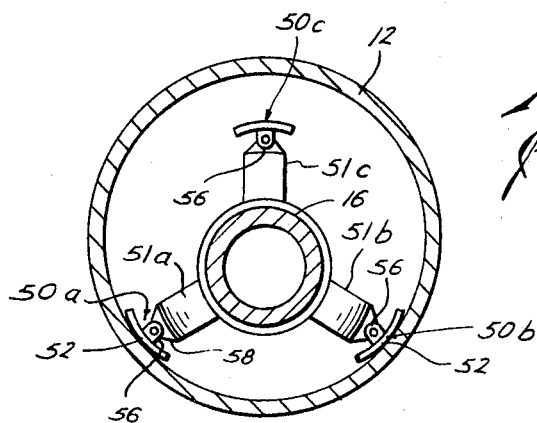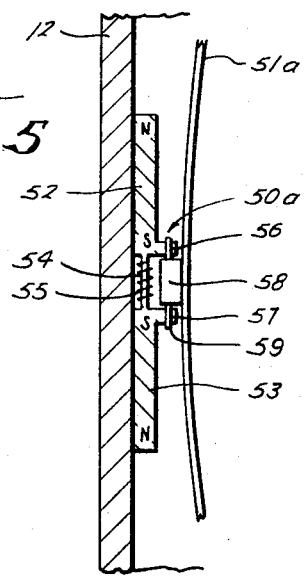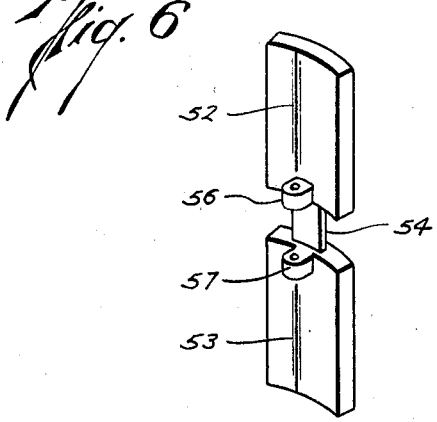

3,267,366
APPARATUS FOR DETECTING MAGNETIC ANOMALIES
Joseph Marie Bricaud, Suresnes, Seine, France, assignor to Societe de Prospection Electrique Schlumberger, S.A., Paris, France, a corporation of France
Filed Sept. 12, 1963, Ser. No. 308,595
Claims priority, application France, Sept. 21, 1962, 910,191
17 Claims. (Cl. 324—34)

This invention relates to apparatus for detecting magnetic anomalies in tubular objects, particularly where such tubular objects are disposed in a borehole drilled into the earth. Such apparatus is particularly useful for detecting the joints between sections of casing pipe lining an oil well borehole.

Various types of devices for detecting joints and collars between sections of casing pipe lining a borehole have been heretofore proposed. Typical of these are the devices described in U.S. Patent No. 2,459,499, granted to Castel, and U.S. Patent No. 2,558,427, granted to Fagan. These devices include a detecting instrument which is adapted to be moved through the borehole by means of a cable suspended from the surface of the earth. The detecting instrument is constructed so that an electrical signal is generated each time the instrument crosses a joint in the casing pipe. These signals are transmitted by way of insulated conductors contained in the cable to suitable indicating or recording apparatus located at the surface of the earth. Indications obtained in this manner are useful in controlling the depth at which other operations are carried out in the borehole. In particular, they are useful for positioning various tools and instruments at desired depths in the borehole.

Various problems have arisen with respect to the use of these casing joint locators. One problem is that the detecting instrument which is to be lowered into the borehole must sometimes be of a relatively small diameter in order to pass through an intermediate string of narrow diameter tubing which lies above the zone of interest. Reducing the diameter of the detecting instrument, however, tends to reduce the sensitivity or efficiency of such instrument. Also, it is frequently required that such instrument be combined with other borehole devices where such other devices must be operated in a centralized position in the borehole. This further reduces the sensitivity or efficiency of the joint detecting instrument, particularly, where the instrument is of a small diameter. As a consequence, the instrument may fail to provide a clear indication of one or more of the casing joints.

It is an object of the invention, therefore, to provide new and improved apparatus for detecting magnetic anomalies in a borehole which substantially avoids one or more of the foregoing limitations.

It is another object of the invention to provide new and improved magnetic anomaly detecting apparatus capable of detecting magnetic anomalies which are relatively small or slight in character.

It is a further object of the invention to provide new and improved magnetic anomaly detecting apparatus which may be with equal efficiency used in casing pipes of different diameters.

It is an additional object of the invention to provide new and improved magnetic anomaly detecting apparatus which will provide more accurate results when used with centralized types of borehole tools.

In accordance with a feature of the invention, apparatus for detecting magnetic anomalies in a cased borehole comprises an elongated support member adapted for movement through a cased borehole. The apparatus also includes centralizer means coupled to the support member and including a plurality of wall-engaging members for keeping the support member in a central position in the borehole. The apparatus further includes a plurality of magnet means individually located on different ones of the wall-engaging members and individually generating a magnetic flux field which passes through the casing. The apparatus also includes means for detecting variations in the magnetic flux fields.

For a better understanding of the present invention, together with other and further objects and features thereof, reference is had to the following description taken in connection with the accompanying drawings, the scope of the invention being pointed out in the appended claims.

Referring to the drawings:
FIG. 1 shows borehole apparatus including a representative embodiment of magnetic anomaly detecting apparatus constructed in accordance with the present invention;
FIG. 2 is a cross-sectional view taken along the section line 2—2 of FIG. 1;
FIG. 3 is an enlarged cross-sectional view of a portion of the FIG. 1 apparatus;
FIG. 4 is a cross-sectional view showing a modified form of magnetic anomaly detecting apparatus;
FIG. 5 is an elevational view of a portion of the apparatus shown in FIG. 4; and
FIG. 6 is a perspective view of part of the FIG. 5 apparatus.

Referring to FIG. 1 of the drawings, there is shown apparatus for use in a borehole 10 drilled into subsurface earth formations 11. The borehole 10 is lined with steel casing pipe 12. The annular space between the outside of the casing pipe 12 and the earth formations 11 is filled with a layer of cement 13. The casing pipe 12 is made in sections and typical joints between sections are indicated at 14 and 15. These casing joints 14 and 15 are of the flush-joint type.

The apparatus used in the borehole 10 includes an elongated support member 16 adapted for movement through the interior of the casing pipe 12. Support member 16 is suspended from the surface of the earth by means of an armored multiconductor cable 17. Coupled to the support member 16 are an upper centralizer assembly 18 and a lower centralizer assembly 19. These centralizer assemblies keep the support member 16 in a central position in the borehole 10. The upper centralizer assembly 18 includes a plurality of spring-type arm members 20 which are connected between a fixed upper collar member 21 and a slidable lower collar member 22. A coil-type spring 23 is provided for urging the slidable collar 22 in an upwardly direction.

The lower centralizer assembly 19 includes three wall-engaging members or arm members 24a, 24b, and 24c, the latter being seen in the cross-sectional view of FIG. 2. The arm members 24a, 24b, and 24c are constructed of a resilient metal such as spring steel. In some cases, it may be desired to use a non-magnetic metal for these arm members, though in the present embodiment this is not necessary. These arm members 24a, 24b, and 24c are coupled to the support member 16 by means of a fixed upper collar member 25 and a slidable lower collar member 26. A coil-type spring 27 is mounted on the lower end of the support member 16 for urging the slidable collar member 26 in an upwardly direction.

Attached to or forming part of the medial sections of the arm members 24a, 24b, and 24c are individual magnetic anomaly detection means 30a, 30b, and 30c. Each of these detection means 30a, 30b, and 30c operates to generate an electrical signal whenever it passes over a joint in the casing pipe 12. These electrical signals are supplied by way of insulated conductors 31a, 31b, and 31c, appropriate circuits contained within the support member 16, and insulated conductors in the cable 17 to a signal recorder 32 located at the surface of the earth. Recorder 32 records these signals on an appropriate recording medium which is moved in synchronism with the movement of the support member 16 through the borehole 10.

Included within or mounted on a middle section 33 of the support member 16 is appropriate apparatus for performing additional measurements in the borehole 10. Thus, for example, the middle section 33 may include sonic measuring apparatus for determining the character of the bond between the cement 13 and the casing 12. Instead, the middle section 33 may include suitable flowmeter apparatus or fluid density measuring apparatus for measuring the flow rate or the density of fluid in the casing pipe 12 for the case of a producing oil well.

Referring now to FIG. 3 of the drawings, there is shown an enlarged cross-sectional view of the magnetic anomaly detection means 30a of FIG. 1. As seen in FIG. 3, the detection means 30a includes magnet means for generating magnetic flux fields which pass through the casing 12. This magnet means includes a pair of elongated permanent magnets 35 and 36 of equal strength which are longitudinally spaced apart from one another and which are arranged in an opposing manner, that is, with the neighboring ends of the two magnets being of the same polarity. The magnet means also includes longitudinally spaced apart sets of pole pieces 37, 38 and 39, 40, with the pole pieces of each set being located at the ends of different ones of the permanent magnets 35 and 36. Each of the pole pieces 37, 38, 39, and 40 is constructed of a magnetic material such as soft iron. The magnet means further includes a magnetic member 41 which provides a magnetic flux path between the pole pieces 38 and 39. This intermediate member 41 is also constructed of a magnetic material such as soft iron.

The detection means 30a also includes means for detecting variations in the magnetic flux fields generated by the magnet means. In the present embodiment, this flux detecting means includes a coil 42 which is wound around the magnetic member 41. Electrical connection to the coil 42 is made by way of lead wires 31a.

Magnets 35 and 36 and pole pieces 37, 38, 39, and 40 are mounted in a metal frame member 43 which, in turn, is attached at its two longitudinal extremities to the upper and lower portions of the arm member 24a. A predetermined separation or spacing between the pole pieces 37, 38, 39, and 40 and the inner wall of the casing 12 is maintained by means of a thin sheet or layer of non-magnetic material 44 which is secured to the front side of the frame member 43. A cover plate 45 is secured to the backside of the frame member 43. The frame member 43, the front sheet or plate 44, and the back plate 45 are each constructed of a non-magnetic metal such as K-Monel, a nickel alloy. These members 43, 44, and 45, which constitute the medial portion of the arm member 24a, are constructed to provide a stiffness which is several times larger than the average stiffness of the portions of arm member 24a which are located thereabove and therebelow.

The other magnetic anomaly detection means 30b and 30c located on the other arm members 24b and 24c are constructed in the same manner as is the detection means 30a.

Since each of the detection means 30a, 30b, and 30c includes a coil winding which generates an electrical signal, these signals may be observed or recorded in various ways. For example, the three individual signals from the three different detection means may be separately transmitted to the recorder 32 at the surface and the recorder 32 may be made to provide a separate indication or a separate trace for each of these signals. Instead, the three separate signals may be combined to provide a single composite signal which is recorded as a single trace by the recorder 32. One way of combining the three signals is to provide within the support member 16 three separate amplifier circuits having their output terminals connected in common with one another. The three separate signals are supplied to the inputs of the three amplifier circuits and the resulting composite signal appearing across the common output terminals is then transmitted to the recorder 32 at the surface.

Considering now the operation of the apparatus described up to this point, the support member 16 is moved through the borehole and, at the same time, the three anomaly detection means 30a, 30b, and 30c are urged against the inner wall of the casing 12 at three angularly spaced locations around the circumference thereof. Whenever the detection means 30a, 30b, and 30c pass over a magnetic anomaly in the casing 12, the magnetic fields produced by the permanent magnets in these detection means are disturbed and these disturbances are detected by the associated detection coils to provide appropriate electrical output signals. These electrical signals are recorded by the recorder 32 at the surface of the earth. They may also be visually observed and counted for purposes of positioning the support member 16 at a desired depth in the borehole 10.

Considering the magnetic fields generated by a single one of the detection means, in particular, the detection means 30a shown in FIG. 3, and assuming for the moment that no anomalies or discontinuities are present in the casing 12, then the magnetic flux generated by the permanent magnet 35 is directed by the pole piece 37 into the casing 12. Such flux passes down through the casing 12, enters the pole piece 38 and returns to the magnet 35. At the same time, the flux generated by the lower magnet 36 passes from the pole piece 40, through the casing 12, into th pole piece 39 and back to the magnet 36. Thus, in the absence of an anomaly, there is no appreciable flow of magnetic flux through the magnetic member 41 and no output signal is developed across the terminals of the detection coil 42.

If, on the other hand, there is an anomaly present in the casing 12, such as, for example, a gap in the inner wall of the casing such as may occur at the joint between two neighboring lengths of casing, then, as this anomaly passes in front of the pole piece 38, some of the flux generated by the magnet 35 is deflected through the casing 12 to the pole piece 39, from which it returns through the magnetic member 41 to the magnet 35. This produces a momentary change in the flux passing through the detection coil 42, which in turn, generates a momentary pulse of voltage across the output terminals of such coil 42.

As the anomaly in the casing 12 passes in front of the pole piece 39, a similar result occurs for the lower magnet 36. Part of the flux from the magnet 36 is caused to remain in the casing 12 and re-enter the detection means by way of the pole piece 38, from which it returns to the magnet 36 by way of the magnetic member 41. This also causes a momentary pulse of voltage to appear across the terminals of the coil 42.

Since the magnetic anomalies or discontinuities represented by the joints in the casing pipe are generally of a more substantial character than other types of anomalies that may exist in the casing 12 and since they occur at rather well defined intervals, the resulting electrical signals may be observed to determine the number of casing joints which have been passed over by the detection means. In this manner, the support member 16 may be accurately positioned at a desired location in the borehole. Since the magnetic detection means of the present invention have rather small circumferential dimensions and since they are urged against the wall of the casing pipe, such apparatus may be used with equal facility and accuracy in casing pipes of different diameters. In other words, the operation of the detection means is relatively independent of the diameter of the casing pipe. Also, since a plurality of individual detection means are urged against the casing at a plurality of points around the circumference thereof, it is possible to more accurately discriminate between anomalies, such as casing joints, which extend completely around the circumference of the casing pipe and other types of anomalies which exist only on one side or over part of the circumference of the casing pipe.

Another advantage of the present embodiment is shown by the particular case illustrated in the cross-sectional view of FIG. 2. In this case, the borehole is assumed to have a substantial slope or inclination with respect to a true vertical direction. As a consequence, the weight of the support member 16 causes such member to lie more towards one side of the casing and to cause one of the arm members, in this case arm member 24c, to remain out of engagement with the wall of the casnig 12. Nevertheless, the remaining two detection means 30a and 30b continue to produce signals of fairly substantial amplitude. In fact, the signal amplitude for either of the detectors 30a and 30b alone remains about the same as it would have been with the support member 16 accurately centered in the casing pipe 12. As illustrated in FIG. 2, the air gap between the pole pieces in the detection means 30a and 30b and the wall of the casing 12 may be somewhat increased due to the obliquness of their contact with the casing 12. This, however, does not cause any appreciable decrease in the signal amplitude generated by either of these detection means 30a and 30b because their nonmagnetic front cover plates, such as cover plate 44 in FIG. 3, always provide some separation between their pole pieces and the casing pipe 12. Thus, very little extraneous signal is introduced by any changes in the eccentricity of the support member 16.

Referring now to FIGS. 4 and 5 of the drawings, there is shown a modified embodiment of magnetic anomaly detection means constructed in accordance with the present invention. The horizontal cross-sectional view of the borehole of FIG. 4 is similar to the cross- sectional view given in FIG. 2, except that the support member 16 is provided with three detection means 50a, 50b, and 50c having a different form of construction. These detection means are individually attached to the medial portions of three arm members 51a, 51b, and 51c. These arm members are coupled to the support member 16 in the manner previously indicated in FIG. 1. Each of the three detection means 50a, 50b, and 50c is of similar construction.

Considering in detail the construction of the detection means 50a, the construction thereof is best seen in FIG. 5. As there seen, the detection means 50a includes a pair of longitudinally spaced apart permanent magnets 52 and 53 of equal strength, the adjacent, like poles of which are connected by a magnetic member 54, having a narrow cross section than permanent magnets 52 and 53, providing a flux path therebetween. A detection coil 55 is wound around the intermediate magnetic member 54. The magnets 52 and 53 and the magnetic member 54 may be formed from a single piece of metal, such as a magnetic steel, the magnet portions 52 and 53 being provided with a slight lateral curvature (as seen in FIG. 4) which matches the curvature of the inner wall of the casing 12. This utilization of a single piece of metal can readily be accomplished, for example, by separately magnetizing permanent magnets 52 and 53. The intermediate magnetic member 54 is in the form of a notch or undercut portion in such single piece of metal.

The magnet means represented by the magnets 52 and 53 and the magnetic member 54 are pivotally connected to the medial portion of the arm member 51a by means of hinge members 56 and 57 attached to magnets 52 and 53, a hinge member 58 attached to the arm member 51a, and a pivot pin 59 which passes through aligned pivot holes in the hinge members 56, 57, and 58. Thus, as indicated in FIG. 4, when the support member 16 is off center in the casing pipe 12, the detection means may pivot or rock to one side so as to maintain good contact with the inner wall of the casing 12.

The detection means of this embodiment operate in much the same manner as before, the magnetic flux from the respective magnets 52 and 53 passing from their north poles, through the casing 12 and back to their south poles in the absence of any magnetic anomalies or discontinuities in the casing 12. The presence of an anomaly adjacent the south pole, that is, the innermost pole of either magnet, will cause some of the flux to be diverted to the other magnet and to return by way of the intermediate magnetic member 54.

While there have been described what are at present considered to be preferred embodiments of this invention, it will be obvious to those skilled in the art that various changes and modifications may be made therein without departing from the invention, and it is, therefor, intended to cover all such changes and modifications as fall within the true spirit and scope of the invention.

What is claimed is:

1. Apparatus for detecting magnetic anomalies in a cased borehole comprising:
   an elongated support member adapted for movement through a case borehole;
   centralizer means coupled to the support member and including a plurality of wall-engaging members for keeping the support member in a central position in the borehole;
   a plurality of magnet means individually located on different ones of the wall-engaging members and individually generating a magnetic flux field which passes through the casing;
   and means for detecting variations in the magnetic flux fields, whereby at least one of the wall-engaging members containing a magnet means is adapted to be in contact with the casing at all times in the cased borehole.

2. Apparatus for detecting magnetic anomalies in a cased borehole comprising:
   an elongated support member adapted for movement through a cased borehole;
   centralizer means coupled to the support member and including a plurality of arm members for keeping the support member in a central position in the borehole;
   a plurality of magnet means individually located on different ones of the arm members and individually generating a magnetic flux field which passes through the casing;
   and means for detecting variations in the magnetic flux fields, whereby at least one of the arm members containing a magnet means is adapted to be in contact with the casing at all times in the cased borehole.

3. An apparatus for detecting magnetic anomalies in a cased borehole comprising:
   an elongated support member adapted for movement through a cased borehole;
   centralizer means coupled to the support member and including a plurality of wall-engaging members for keeping the support member in a central position in the borehole;
   a plurality of permanent magnets individually located on different ones of the wall-engaging members and individually generating a magnetic flux field which passes through the casing;
   and means responsive to at least a portion of the magnetic flux fields which pass through the casing for detecting variations in the magnetic flux fields, whereby at least one of the wall-engaging members containing a permanent magnet is adapted to be in contact with the casing at all times in the cased borehole.

4. Apparatus for detecting magnetic anomalies in a cased borehole comprising:
   an elongated support member adapted for movement through a cased borehole;

centralizer means coupled to the support member and including a plurality of wall-engaging members for keeping the support member in a central position in the borehole;

a plurality of magnet means individually located on different ones of the wall-engaging members and individually generating a magnetic flux field which passes through the casing;

and a plurality of coil means individually located on different ones of the wall-engaging members for detecting variations in the respective magnetic flux fields, whereby at least one of the wall-engaging members containing a magnet means is adapted to be in contact with the casing at all times in the cased borehole.

5. Apparatus for detecting magnetic anomalies in a cased borehole comprising:

an elongated support member adapted for movement through a cased borehole;

centralizer means coupled to the support member and including at least three arm members for keeping the support member in a central position in the borehole;

at least three permanent magnets individually located on different ones of the arm members and individually generating a magnetic flux field which passes through the casing;

and coil means responsive to at least a portion of the magnetic flux fields which pass through the casing for detecting variations in the magnetic flux fields, whereby at least one of the arm members containing a permanent magnet is adapted to be in contact with the casing at all times in the cased borehole.

6. Apparatus for detecting magnetic anomalies in a cased borehole comprising:

a support member adapted for movement through a cased borehole;

a plurality of magnet means individually generating a magnetic flux fields;

means for individually supporting the magnet means from the support member and adapted to individually urge the respective magnet means away from the support member and against the casing wall;

and means for detecting variations in the magnetic flux fields, whereby at least one of the magnet means is adapted to be relatively near the casing at all times in the cased borehole.

7. Apparatus for detecting magnetic anomalies in a cased borehole comprising:

a support member adapted for movement through a cased borehole;

a plurality of permanent magnets individually generating a magnetic flux field;

means for individually supporting the permanent magnets from the support member and adapted to individually urge the respective permanent magnets away from the support member and toward the casing wall;

and means for detecting variations in the magnetic flux fields, whereby at least one of the permanent magnets is adapted to be relatively near the casing at all times in the cased borehole.

8. Apparatus for detecting magnetic anomalies in a cased borehole comprising:

a support member adapted for movement through a cased borehole;

at least three permanent magnets individually generating a magnetic flux field;

means for individually supporting the permanent magnets from the support member and adapted to individually urge the respective permanent magnets away from the support member and toward the casing wall at three angularly spaced apart locations around the circumference of the casing;

and coil means for detecting variations in the magnetic flux fields, whereby at least one of the permanent magnets is adapted to be relatively near the casing at all times in the cased borehole.

9. Apparatus for detecting magnetic anomalies in a cased borehole comprising:

a support member adapted for movement through a cased borehole;

a plurality of wall-engaging members coupled to the support member and adapted to be urged away from the support member and against the casing wall;

magnet means located on each wall-engaging member;

a pair of pole means located on each magnet means for passing magnetic flux between two longitudinally spaced apart locations on the casing;

third pole means located on each wall-engaging member and longitudinally spaced apart from each pair of pole means;

means providing magnetic flux paths between each of the third pole means and each of the corresponding magnet means;

and coil means for detecting flux changes in each of the flux path means.

10. Apparatus for detecting magnetic anomalies in a cased borehole comprising:

a support member adapted for movement through a cased borehole;

a wall-engaging member coupled to the support member and adapted to be urged away from the support member and against the casing wall;

a permanent magnet located on the wall-engaging member;

a pair of pole piece means individually located at opposite ends of the permanent magnet for passing magnetic flux between two longitudinally spaced apart locations on the casing;

third pole piece means located on the wall-engaging member and longitudinally spaced apart from the pair of pole piece means;

means located on the wall-engaging member for maintaining a predetermined separation at all times between the pole piece means and the casing wall;

a magnetic member providing a magnetic flux path between the third pole piece means and one of the pair of pole piece means;

and a coil encircling the magnetic member for detecting flux changes in such magnetic member.

11. Apparatus for detecting magnetic anomalies in a cased borehole comprising:

a support member adapted for movement through a cased borehole;

a plurality of wall-engaging members coupled to the support member and adapted to be urged away from the support member and against the casing wall;

a plurality of permanent magnets located on different ones of the wall-engaging members;

a separate pair of pole piece means individually located at opposite ends of each of the permanent magnets for passing magnetic flux between two longitudinally spaced apart locations on the casing;

third pole piece means located on said different ones of the wall-engaging members and longitudinally spaced apart from each of the pair of pole piece means;

a layer of non-magnetic material located on the pole piece means for maintaining a predetermined separation between the pole piece means of at least one of the wall-engaging members and the casing wall;

a plurality of magnetic members providing magnetic flux paths between each of the third pole piece means and one pole piece means of one of the pairs of pole piece means;

and a plurality of coils encircling the magnetic members for detecting flux changes in each magnetic member.

12. Apparatus for detecting magnetic anomalies in a cased borehole comprising:
- a support member adapted for movement through a cased borehole;
- a plurality of wall-engaging members coupled to the support member and adapted to be urged away from the support member and against the casing wall;
- a plurality of magnet means individually located on different ones of the wall-engaging members;
- a plurality of pairs of pole means individually located on different ones of the magnet means for passing magnetic flux between two longitudinally spaced apart locations on the casing;
- a plurality of third pole means individually located on different ones of the wall-engaging members and longitudinally spaced apart from the corresponding pair of pole means;
- a plurality of magnetic means individually located on different ones of the wall-engaging members and providing a magnetic flux path between the third pole means and the magnet means on the respective wall-engaging members;
- and a plurality of coil means for individually detecting flux changes in the individual magnetic means.

13. Apparatus for detecting magnetic anomalies in a cased borehole comprising:
- a support member adapted for movement through a cased borehole;
- a plurality of wall-engaging members coupled to the support member and adapted to be urged against the casing wall;
- a pair of longitudinally spaced apart permanent magnets forming part of each wall-engaging member, each permanent magnet generating a magnetic flux field which passes through the casing;
- magnetic members providing magnetic flux paths between each of the two permanent magnets;
- and a coil encircling each magnetic member for detecting flux changes therein in response to at least a portion of the magnetic flux field which passes through the casing.

14. Apparatus for detecting magnetic anomalies in a cased borehole comprising:
- a support member adapted for movement through a cased borehole;
- a plurality of arm members coupled to the support member and adapted to be urged against the casing wall;
- and detection means attached to each arm member and including a pair of longitudinally spaced apart magnet means for individually passing magnetic flux between spaced apart locations on the casing, means providing a magnetic flux path between the two magnet means, and coil means for detecting flux changes in the flux path means, whereby at least one of the arm members to which is attached a detection means is adapted to be in contact with the casing at all times in the cased borehole.

15. Apparatus for detecting magnetic anomalies in a cased borehole comprising:
- a support member adapted for movement through a cased borehole;
- an arm member coupled to the support member and adapted to be urged toward the casing wall;
- and detection means pivotally connected to the arm member on the side thereof nearer the casing and including a pair of longitudinally spaced apart magnet means for individually passing magnetic flux between spaced apart locations on the casing, means providing a magnetic flux path between the two magnet means, and coil means for detecting flux changes in the flux path means.

16. Apparatus for detecting magnetic anomalies in a cased borehole comprising:
- a support member adapted for movement through a cased borehole;
- a plurality of arm members coupled to the support member and adapted to be urged toward the casing wall;
- and a plurality of detection means individually attached to different ones of the arm members and individually including a pair of longitudinally spaced apart magnet means for individually passing magnetic flux between spaced apart locations on the casing, means providing a magnetic flux path between the two magnet means, and coil means for detecting flux changes in the flux path means, whereby at least one of the arm members to which is attached a detection means is adapted to be in contact with the casing at all times in the cased borehole.

17. Apparatus for detecting magnetic anomalies in a cased borehole comprising:
- a support member adapted for movement through a cased borehole;
- a plurality of wall-engaging members coupled to the support member and adapted to be urged against the casing wall;
- individual magnet means located on different ones of the wall-engaging members for generating a magnetic flux field;
- pole piece means located on said different ones of the wall-engaging members for passing the magnetic flux through the casing;
- means located on said different ones of the wall-engaging members for maintaining the pole piece means on at least one of the wall-engaging members at a predetermined distance from the casing at all times within the cased borehole; and
- means for detecting variations in the magnetic flux fields.

References Cited by the Examiner
UNITED STATES PATENTS

| | | | |
|---|---|---|---|
| 2,194,229 | 3/1940 | Johnson et al. | 324—37 |
| 2,459,499 | 1/1944 | Castel | 324—34.1 |
| 2,558,427 | 6/1951 | Fagan | 324—34 |
| 2,892,151 | 6/1959 | Bender | 324—34 |
| 2,987,668 | 6/1961 | Gondouin | 324—34 |

RICHARD B. WILKINSON, *Primary Examiner.*